United States Patent [19]

Kress

[11] 4,041,730
[45] Aug. 16, 1977

[54] MARINE PROPELLER BUSHING COUPLING

[75] Inventor: Robert F. Kress, Grand Rapids, Mich.

[73] Assignee: Dana Corporation, Toledo, Ohio

[21] Appl. No.: 657,258

[22] Filed: Feb. 11, 1976

[51] Int. Cl.² ............................................. F16D 7/02
[52] U.S. Cl. ................................. 64/30 D; 64/11 R; 64/27 NM; 403/228; 416/134 R
[58] Field of Search .............. 64/30 D, 27 NM, 11 R; 403/225, 228; 416/134, 169

[56] References Cited

U.S. PATENT DOCUMENTS

| 2,044,392 | 6/1936 | Lord | 64/11 R |
|---|---|---|---|
| 2,564,605 | 8/1951 | Martin | 64/30 D |
| 2,774,620 | 12/1956 | Thiry et al. | 403/228 |
| 2,827,281 | 3/1958 | Cooney | 403/228 |
| 3,012,421 | 12/1961 | Cull | 64/11 R |
| 3,146,612 | 9/1964 | Lorenz | 64/11 R |

*Primary Examiner*—Samuel Scott
*Assistant Examiner*—Randall Heald
*Attorney, Agent, or Firm*—Price, Heneveld, Huizenga & Cooper

[57] ABSTRACT

A marine propeller drive coupling bushing assembly with an annular rubber bushing between radially inner and outer elements forming an annular bushing cavity rectangular in cross section, the rubber bushing being distortionally forced thereinto from a free form of an annulus having a trapezoidal cross sectional configuration. The displacement from the free trapezoidal cross section to the distorted configuration is 40-60%.

2 Claims, 5 Drawing Figures

MARINE PROPELLER BUSHING COUPLING

BACKGROUND OF THE INVENTION

This invention relates to a drive coupling bushing assembly for marine propellers. The drive train for marine propulsion equipment presently marketed typically includes a coupling employing an annular rubber bushing element between inner and outer sleeves, one of which rotates the bushing and the other of which is rotated by the bushing. Such a drive coupling employs a frictional drive engagement between the bushing and the outer sleeve, enabling controlled slippage in the event the propeller strikes an object. Assembly of these components is typically achieved by bonding the rubber bushing element to the inner sleeve as by vulcanizing and/or use of polymeric bonding agents, and press fitting the bushing element into the outer sleeve. A general assembly of this type for an inboard-outboard arrangement is set forth in U.S. Pat. No. 3,146,612. It will be appreciated that slippage at this bushing therefore occurs only under special circumstances, as a safety factor.

More recently the increased power output of marine engines and the increase in propeller effectiveness has resulted in unwanted slippage in the conventional bushing assembly when power is rapidly applied from the engine to the drive shaft to the propeller. This slippage of course prevents the power from being fully applied to the propeller. Moreover, repeated slippage of the bushing significantly lessens its frictional engagement, leading to steadily decreasing effectiveness and ultimate failure.

SUMMARY OF THE INVENTION

This invention effects a superior bushing drive connection in the coupling of an outboard marine power train. The bushing assembly allows for the rare occasion of slippage of the frictional drive as a safety factor, but exhibits greatly increased torque pull capacity so as to normally prevent slippage of the frictional engagement, even under tremendous loads. Moreover, the unit has increased resistance to failure by rupture between the bushing and its insert sleeve or tube.

This superior torque capacity is specially achieved by a particular configuration of the rubber bushing element in its free, i.e. undistorted condition, prior to assembly. This free configuration is also distorted during assembly with a controlled amount of displacement within its surrounding retainer sleeve. Specifically, the free configuration of the rubber bushing element is an annulus with a substantially trapezoidal cross section, on a radial plane, the base of the trapezoid being radially inwardly in engagement with the inner sleeve. The displacement of the element, from its free configuration to its distorted installed configuration, is within the range of 40 to 60%, the free cross sectional configuration being changed distortionally so as to substantially match the rectangular cross sectional shape of the annular chamber between the inner sleeve and the outer sleeve or hub. I.e., the configuration of the bushing is forcefully changed with a displacement of 40 to 60% from a trapezoidal shape to one which approximates rectangular. The bonded area between the bushing and sleeve is maximized with the novel configuration, increasing resistance to rupture therebetween.

DESCRIPTION OF THE PREFERRED EMBODIMENTS

Figure 1:
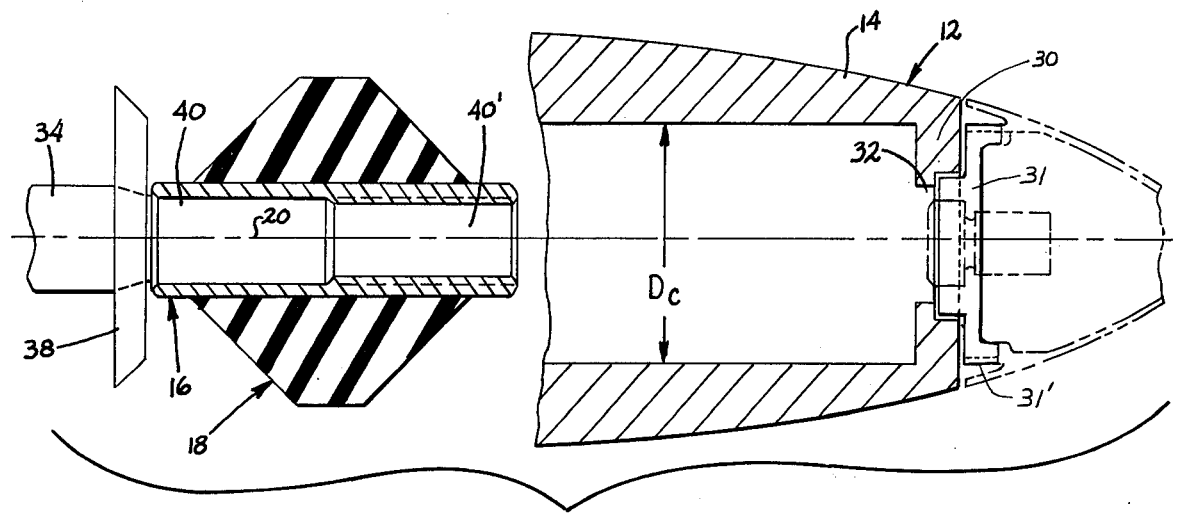
FIG. 1 is an elevational exploded sectional view of the components of the novel coupling, prior to assembly.
Figure 5:
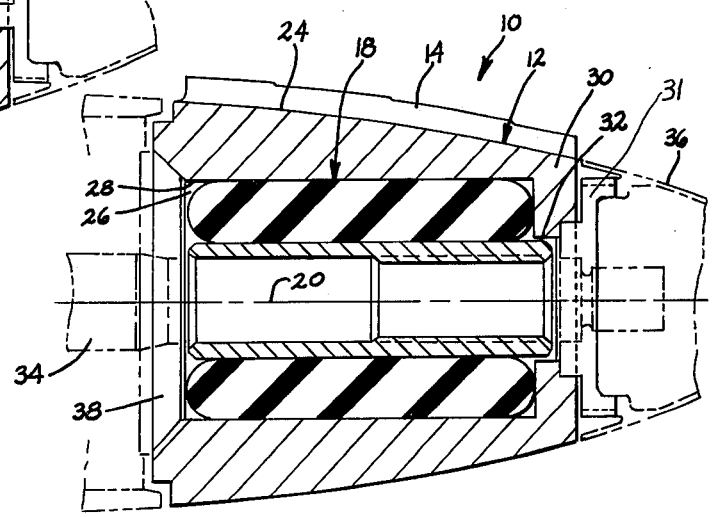
FIG. 5 is a sectional elevational view of the final assembly of the invention.

Referring now specifically to the drawings, the complete propeller assembly 10 (FIG. 5) is formed from the components illustrated in FIG. 1. The main components comprise a propeller hub or housing 12 which forms an outer sleeve, and from which a plurality of propeller blades 14 project radially outwardly in conventional fashion, an inner drive sleeve component 16, and a rubber bushing element 18. All of these components except the blades are of symmetrical configuration about a common central rotational axis 20, with the blades being symmetrically arranged therearound.

Outer sleeve 12 has an elongated, generally annular configuration with an outer surface that tapers or flares outwardly forwardly from its smaller diameter rearward end to its larger diameter forward end where it aligns with the gear case 13. The outer surface 24 of the hub is generally frusto conical in configuration but normally having a slight convexity. The interior of hub 12 is hollow, containing a cavity 26 surrounded by a cylindrical inner surface 28 symmetrical around rotational axis 20. The rearward end of hub 12 preferably and normally includes an annular flange portion 30 extending radially inwardly, surrounding a central axial opening 32. Opening 32 receives the rearward end of inner sleeve 16 (FIG. 5) and enables the central drive shaft 34 that extends through sleeve 16 to also extend through portion 30 and also through a conventional thrust plate 31 into attachment with a bullet-shaped, streamlined fairing 36, more commonly known as a fairwater cap or nut. The forward axial end of hub 12 has an opening to the cylindrical cavity 26, but capable of being closed, if desired, by an optional thrust plate 38 of annular configuration around drive shaft 34. With inner sleeve 16 in position, there is formed an annular bushing cavity 26' between sleeve 16 and hub 12. The rear end of the cavity is closed by flange portion 30 on the aft end of the hub, and the forward end, after assembly can be closed by thrust plate 38, these serving as retainers. Fairwater cap 36 can be attached in typical fashion as by threaded engagement on threads 31' at the outer periphery of thrust collar 31.

Figure 3:
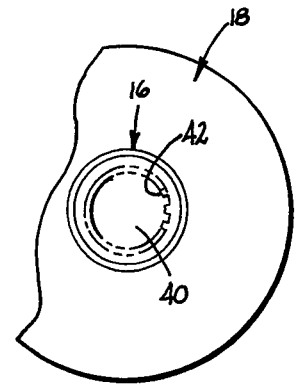
FIG. 3 is a fragmentary end elevational view of the components in FIG. 2.

Inner sleeve 16 is an axially elongated, hollow, cylindrical member, symmetrical about the axis of rotation 20. It contains an axial opening 40 that extends therethrough, with at least the rearward portion 40' having axial splines 42 (FIG. 3) around the inner surface of the sleeve to slidably engage with the mating splines around the outer surface of forward end of drive shaft 40. The rear end of sleeve 16 normally abuts thrust collar 31.

Figure 2:
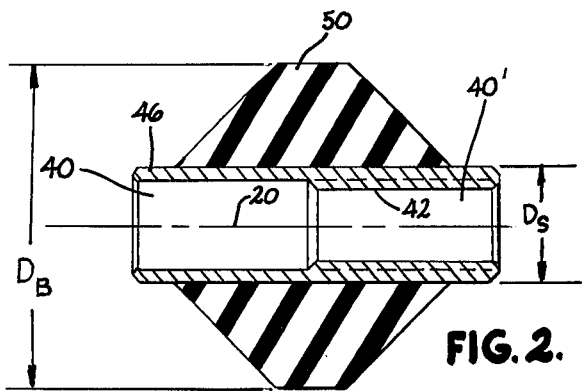
FIG. 2 is a sectional view of the bushing and inner sleeve subassembly prior to assembly of the total coupling.

Around the outer peripheral surface 46 of inner sleeve 16 is the annular rubber bushing 50. The cross section of this bushing, on a radial plane, in its free undistorted condition, is basically trapezoidal, the enlarged base of the trapezoid being in engagement with the outer periphery 46 of inner sleeve 16. The entire inner peripheral surface of bushing 50 is bonded to the outer surface of the sleeve as by vulcanization and/or adhesive bonding agents as is typical. The peculiar configuration of the rubber bushing element, in its free state as depicted in FIGS. 1 and 2, was arrived at after extensive tests conducted using a series of configurations. The inner peripheral surface of the bushing is as long as can be accommodated on the inner sleeve while still limiting the volume of the bushing to slightly less than the volume of space of the annular cavity or chamber 26' formed between the outer surface of inner sleeve 16, the inner surface of outer hub 12 and the axial ends of this annular chamber. The amount of volume of the bushing is sufficiently less than the annular chamber volume so that, when the bushing is forced into the chamber, it will not protrude beyond the axial ends of the chamber, it being a natural tendency of the rubber to bulge in convex fashion on its annular ends (See FIG. 5) rather than exactly filling the cavity corners. The length of the bushing in its free state is thus shorter than the cavity length to accommodate the radial distortion. The maximizing of the bushing length on the inner sleeve increases resistance to rupture under torque, this being important because the greatest amount of torque occurs at this smaller diameter area of contact. The area of engagement is 3.14 $D_S L_B$, where $D_S$ is the diameter of the inner sleeve, and $L_B$ is the axial length of the bushing at its inner periphery.

When dealing with factors concerning propeller drive bushings, it should be realized that there are three dimensions which are usually specified by the engine manufacturer, and therefore pretty well fixed. Specifically, the hub cavity has a specified diameter $D_C$, and has a specified length $L_C$, while the inner sleeve has a specified diameter $D_S$. Within these fixed limits, it is necessary to obtain a construction which will withstand severe torque loads without slippage at the hub and without rupture at the inner sleeve. Extensive testing resulted in the discovery that a bushing of trapezoidal cross section effects unique capacity in these regards. Such a bushing far exceeded the torque capacity of a conventional rectangular cross sectional configuration. Even when the displacement of the novel bushing was made equal to that of a conventional bushing, i.e. about 0.3 to 0.45, it was superior. Moreover, the trapezoidal bushing is capable of displacements of 0.4 and up to result in greatly increased torque load capacity. Optimally, the displacement is in the range of 0.45 to 0.60, i.e. 45 to 60%. That is, the initial diameter of the bushing is made such as to cause a displacement of 40 to 60% when the components are axially forced together with distortion of the bushing element from its free configuration depicted in FIG. 1 to its assembled configuration depicted in FIG. 5.

Figure 4:
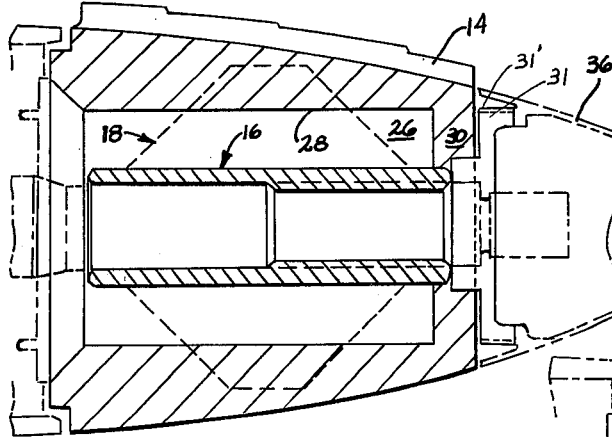
FIG. 4 is a sectional elevational view of the components as assembled, but showing the bushing in phantom in its free configuration.

The configuration of the resilient rubber bushing in this assembled condition is that of a cylindrical annulus, i.e. the outer surface being cylindrical in full engagement with the inner cylindrical surface 28 of the hub, and the bushing element substantially filling the annular space between the two sleeves. The cross sectional configuration of the installed distorted bushing becomes substantially that of the rectangular cross sectional configuration of the annular chamber, except that, as noted previously the distorted bushing rubber inherently tends to bulge at its annular axial ends. The substantially larger outer diameter of the bushing in its free state relative to its outer diameter in its displaced, distorted state can be seen from FIG. 4 where the bushing, in its free state, is shown in phantom lines superimposed upon the hub and annular chamber 26'.

By the term "displacement" is meant the following relationship:

$$\left(\frac{D_C{}^2 - D_S{}^2}{D_B{}^2 - D_S{}^2}\right) \times 100$$

wherein $D_B$ is the outer diameter of the bushing in its free state. $D_S$ is the outer diameter of the inner sleeve, and $D_C$ is the inner diameter of the hub, i.e. of the cylindrical cavity 28.

I.e. the relationship between the element diameters $D_B$, $D_S$, and $D_C$ is:

$$\left(\frac{D_C{}^2 - D_S{}^2}{D_B{}^2 - D_S{}^2}\right) = \text{about 0.4 to 0.6}$$

and preferably equals about 0.5.

The extensive testing conducted resulted in the finding that a displacement of the specially shaped bushing in the range of about 40 to about 60% is optimum. The preferred displacement is about 50%. The rubber employed for the bushing is natural rubber having a durometer between about 50 and about 75, with the preferred durometer being about 70, as measured on the Shorr A scale. Rubber hardness above about 75 can be employed but really yields no added torque capacity and is significantly more difficult, and sometimes impossible, to sufficiently distort for assembly of the product. Operational tests upon this assembly exhibit a significant increase in torque pulling capacity of 50 to 60% over the previous units.

Thus, the specially configurated bushing, distorted to its assembled state, exhibits the greatest torque capability for a specified annular cavity volume for which the length, inner diameter, and outer diameter are normally specified and fixed; while also effecting the greatest possible bonded surface area of the bushing to the inner sleeve for the specified cavity length.

In order to form the novel drive assembly, the bushing 18, after being bonded around the inner sleeve 16, is axially forced, as in a hydraulic press or by spinning them together under pressure, into the smaller diameter interior of the hub while being distortionally displaced from its free configuration to its final configuration.

In adapting this concept to a particular drive assembly, it is conceivable that the cylindrical hub cavity may be tapered slightly from end to end rather than purely cylindrical. This is what is intended by substantially cylindrical. It is also conceivable that the outer surface of the free bushing may have a slight taper from edge to edge. Thus, the terminology "substantially trapezoidal" in specifying the cross sectional configuration of the bushing element is intended to encompass such minor variations.

The embodiments of the invention in which an exclusive property or privilege is claimed are defined as follows:

1. A marine propulsion drive coupling bushing assembly, comprising an outer housing, an inner sleeve, and an annular rubber bushing within said housing and around said sleeve; said housing, sleeve and bushing being symmetrical about a central axis of rotation, said housing forming an inner chamber, and having a substantially cylindrical inner engagement surface of diameter $D_C$ surrounding said inner chamber; said sleeve having an outer surface of diameter $D_S$ spaced radially inwardly of said housing inner engagement surface to define an annular chamber therebetween; said annular bushing having an inner surface bonded to said sleeve outer surface, and having a free configuration substantially trapezoidal in cross section on a radial plane, the base of the trapezoid being at said bushing inner surface; said bushing free configuration having a diameter $D_B$ with the following relationship to diameters $D_C$ and $D_S$:

$$\left（\frac{D_C^2 - D_S^2}{D_B^2 - D_S^2}\right) = \text{about 0.4 to 0.6}$$

and said bushing, in its assembled condition in said annular chamber between said chamber inner surface and said sleeve outer surface, having a diameter equal to diameter $D_C$.

2. The marine propulsion drive coupling bushing assembly in claim 1 wherein:

$$\left(\frac{D_C^2 - D_S^2}{D_B^2 - D_S^2}\right) = \text{about 0.5}$$

* * * * *